(12) United States Patent
Kim

(10) Patent No.: US 11,323,955 B2
(45) Date of Patent: May 3, 2022

(54) METHOD AND APPARATUS FOR HANDLING FREQUENCY PRIORITIES INHERITED FROM OTHER RADIO ACCESS TECHNOLOGIES IN WIRELESS COMMUNICATION SYSTEM

(71) Applicant: LG ELECTRONICS INC., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 71 days.

(21) Appl. No.: 17/045,854

(22) PCT Filed: Jun. 14, 2019

(86) PCT No.: PCT/KR2019/007187
§ 371 (c)(1),
(2) Date: Oct. 7, 2020

(87) PCT Pub. No.: WO2019/240527
PCT Pub. Date: Dec. 19, 2019

(65) Prior Publication Data
US 2021/0076321 A1   Mar. 11, 2021

(30) Foreign Application Priority Data
Jun. 15, 2018  (KR) .......................... 10-2018-0068755

(51) Int. Cl.
*H04W 48/20* (2009.01)
*H04W 48/12* (2009.01)
(Continued)

(52) U.S. Cl.
CPC ............ *H04W 48/20* (2013.01); *H04W 48/12* (2013.01); *H04W 48/16* (2013.01); *H04W 72/0453* (2013.01); *H04W 72/10* (2013.01)

(58) Field of Classification Search
CPC ..... H04W 48/20; H04W 48/12; H04W 48/16; H04W 72/0453; H04W 72/10
See application file for complete search history.

(56) References Cited

U.S. PATENT DOCUMENTS

2017/0339606 A1*  11/2017  Kim .................. H04W 36/0061
2019/0327582 A1*  10/2019  Lee .................. H04W 72/0446

OTHER PUBLICATIONS

Ericsson, "Inheritance of priorities at inter-RAT cell reselection," R2-1806798, 3GPP TSG RAN WG2 #102, Busan, Korea, May 10, 2018, see pp. 1-3; table 1; and figure 1.
(Continued)

*Primary Examiner* — Diane D Mizrahi
(74) *Attorney, Agent, or Firm* — Dentons US LLP

(57) ABSTRACT

A method and apparatus for handling frequency priorities inherited from other radio access technologies (RATs) in a wireless communication system is provided. A user equipment (UE), which inherits information on dedicated frequency priorities from other RATs, applies the dedicated frequency priorities while a timer is running. However, upon receiving information on a broadcast frequency priority from a current cell, and when the information on the broadcast frequency priority includes priority information of a RAT of which priority information is not included in the information on the dedicated frequency priorities, the UE stops applying the dedicated frequency priorities and applying the broadcast frequency priority.

15 Claims, 12 Drawing Sheets

(51) Int. Cl.
*H04W 48/16* (2009.01)
*H04W 72/04* (2009.01)
*H04W 72/10* (2009.01)

(56) References Cited

OTHER PUBLICATIONS

OPPO, "Further Discussion on Configuration of Dedicated Frequency Priority for Network Slicing Regardless of RFSP or Allowed NSSAI and TP to TS 38.300," R2-1806709, 3GPP TSG RAN WG2 #102, Busan, Korea, May 10, 2018, See pp. 1-3.
CATT, "Open Issues on Dedicated Priority in NR," R2-1806714, 3GPP TSG RAN WG2 #102, Busan, Korea, May 10, 2018, See pp. 1-3.
ITRI, "Discussion on the dedicated priority for network slicing in cell reselection," R2-1802152, 3GPP TSG RAN WG2 #101, Athens, Greece, Feb. 14, 2018, See pp. 1-2.
3GPP TS 36.304 V14.6.0, section 5.2.4.1, Mar. 2018.
3GPP TS 36.304 V14.6.0, section 5.2.4.2, Mar. 2018.
3GPP TS 38.304 V2.0.0, section 5.2.4.1, Jun. 2018.
3GPP TS 38.304 V2.0.0, section 5.2.4.2, Jun. 2018.

\* cited by examiner

METHOD AND APPARATUS FOR HANDLING FREQUENCY PRIORITIES INHERITED FROM OTHER RADIO ACCESS TECHNOLOGIES IN WIRELESS COMMUNICATION SYSTEM

This application is the National Stage filing under 35 U.S.C. 371 of International Application No. PCT/KR2019/007187, filed on Jun. 14, 2019, which claims the benefit of Korean Patent Application No. 10-2018-0068755 filed on Jun. 15, 2018, the contents of which are all hereby incorporated by reference herein in their entirety.

TECHNICAL FIELD

The present invention relates to wireless communications, and more particularly, to a method and apparatus for handling frequency priorities inherited from other radio access technologies (RATs) in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

LTE/LTE-advanced (LTE-A) supports inter-radio access technology (RAT) mobility, both to and from other 3GPP and non-3GPP technologies. For example, handover in radio resource connection (RRC) connected state (RRC_CONNECTED) and/or cell (re)-selection in RRC idle state (RRC_IDLE) may be performed from LTE/LTE-A to GSM EDGE radio access network and/or UMTS terrestrial radio access network (UTRAN) or vice versa. Frequency priorities for cell (re)-selection are inherited at cell (re)-selection procedure.

SUMMARY

Due to introduction of NR, mobility from LTE/LTE-A to NR or vice versa is supported. However, direct mobility from GERAN/UTRAN to NR or vice versa is not supported. In this case, frequency priorities inherited at cell (re)-selection may lead to inefficient cell (re)-selection.

In an aspect, a method performed by a wireless device in a wireless communication system is provided. The method includes starting a timer, inheriting information on dedicated frequency priorities from other radio access technologies (RATs), while the timer is running: applying the dedicated frequency priorities, receiving information on a broadcast frequency priority from a current cell, and when the information on the broadcast frequency priority includes priority information of a RAT of which priority information is not included in the information on the dedicated frequency priorities, stopping applying the dedicated frequency priorities and applying the broadcast frequency priority.

In another aspect, a wireless device in a wireless communication system is provided. The wireless device includes a memory, a transceiver, and a processor, operably coupled to the memory and the transceiver. The processor is configured to start a timer, and configured to inherit information on dedicated frequency priorities from other radio access technologies (RATs). While the timer is running, the processor is configured to apply the dedicated frequency priorities, the transceiver is configured to receive information on a broadcast frequency priority from a current cell, and when the information on the broadcast frequency priority includes priority information of a RAT of which priority information is not included in the information on the dedicated frequency priorities, the processor is configured to stop applying the dedicated frequency priorities and apply the broadcast frequency priority.

When mobility from GERAN cell or UTRAN cell to NR cell or vice versa occurs via LTE/LTE-A cell, inter-RAT cell (re)-selection can be performed efficiently.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
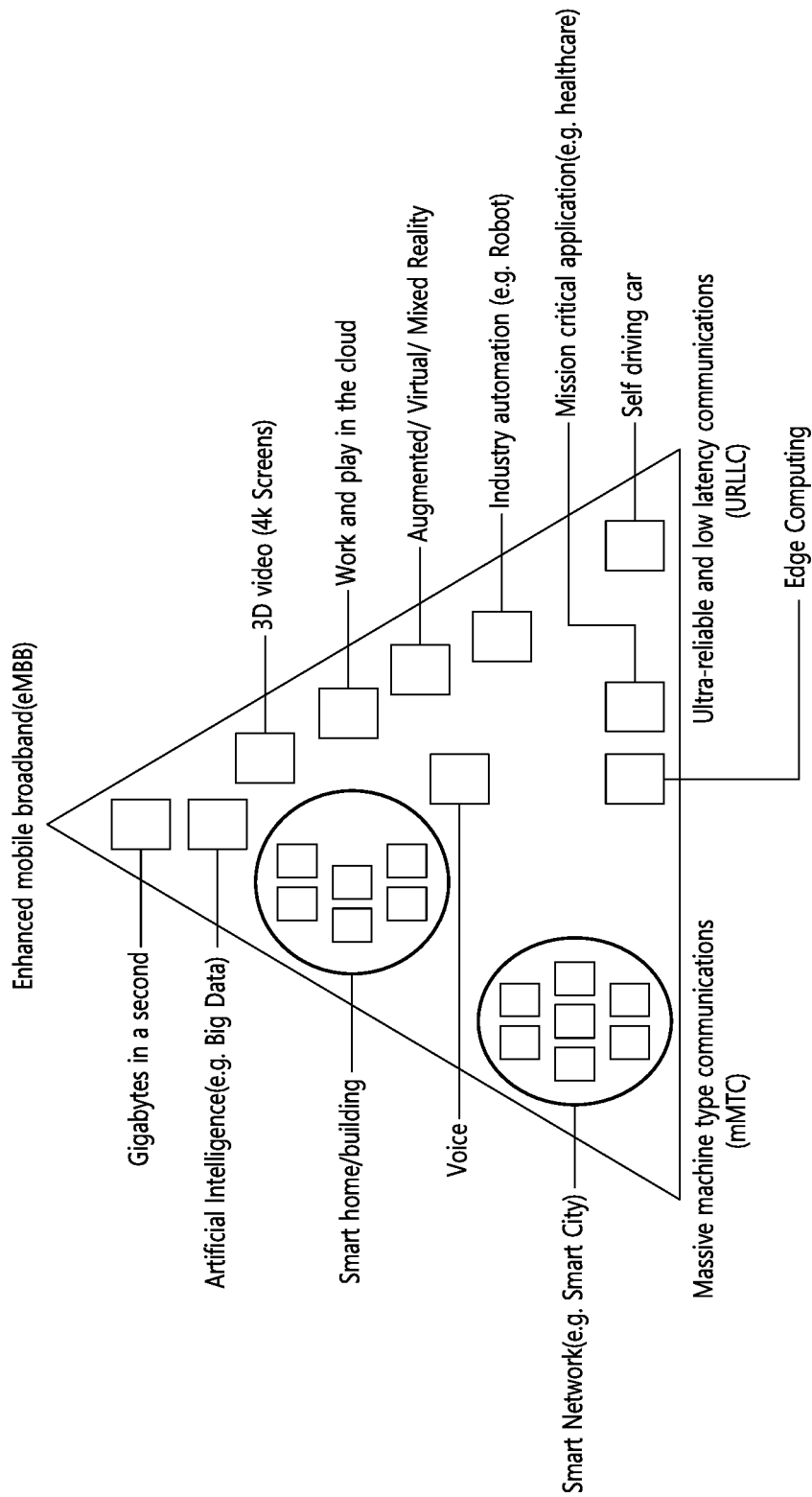
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
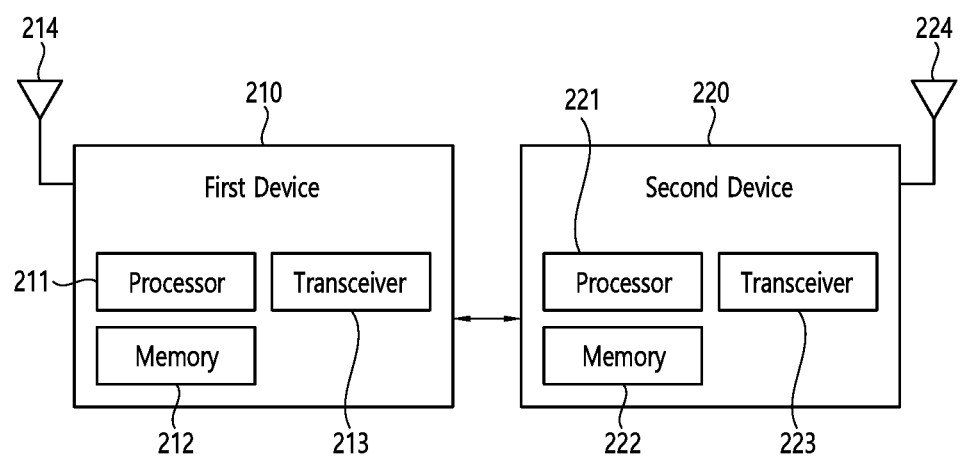
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
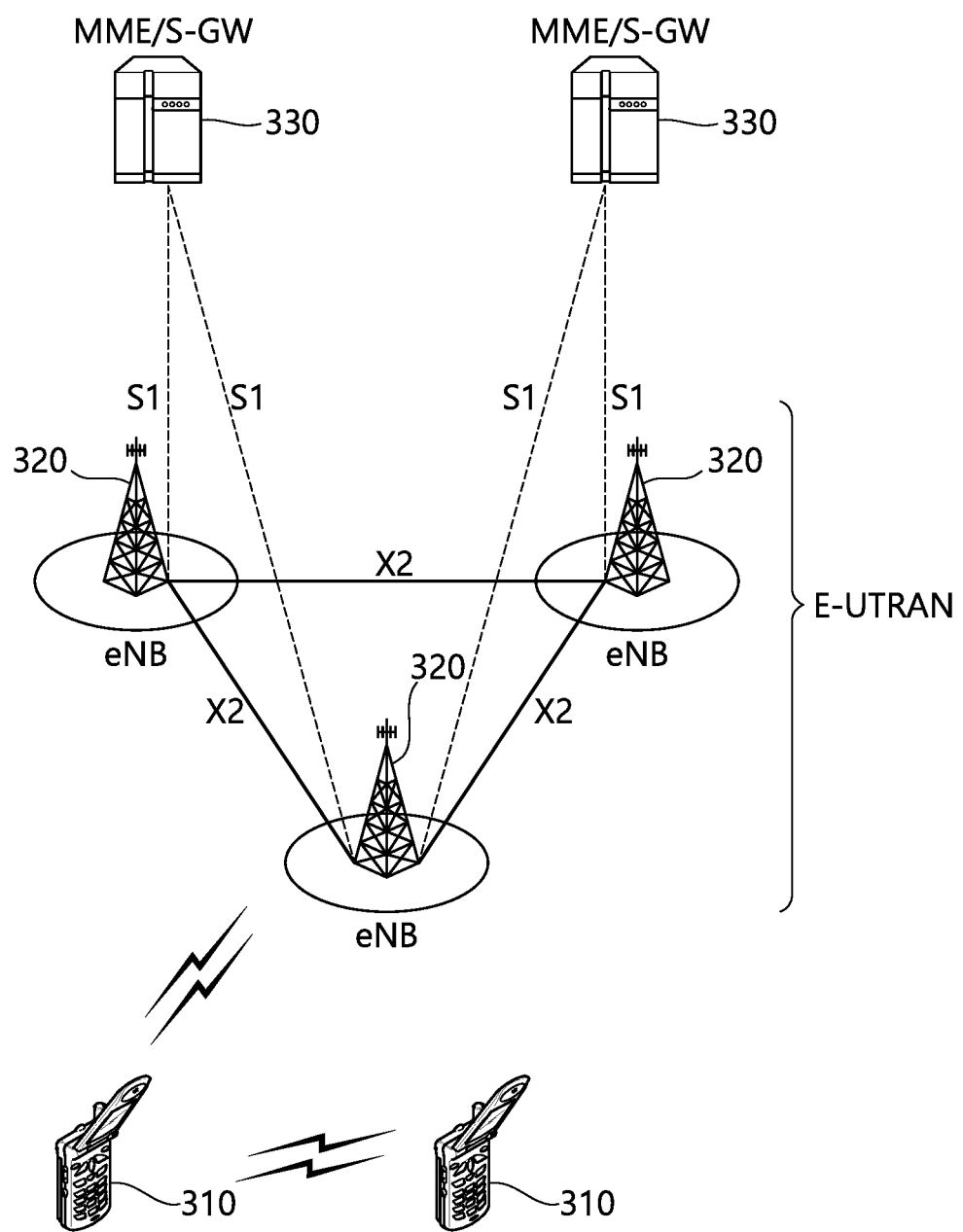
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PCS interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNB s.

Figure 4:
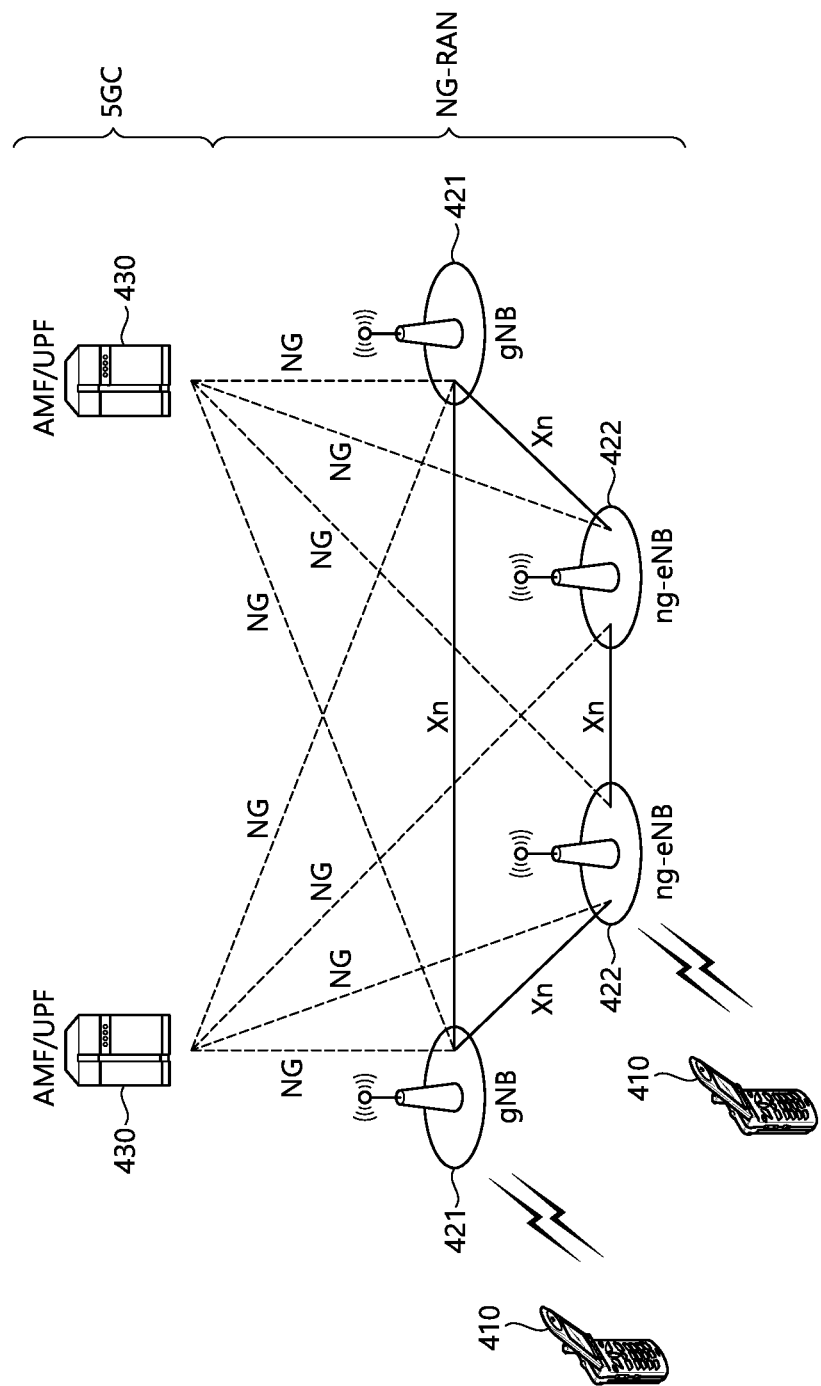
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
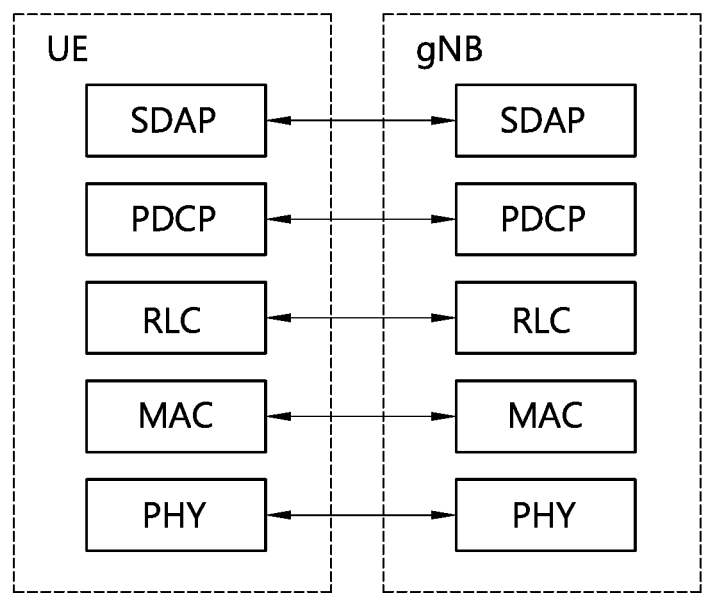
FIG. 5 shows a block diagram of a user plane protocol stack to which the technical features of the present invention can be applied.
Figure 6:
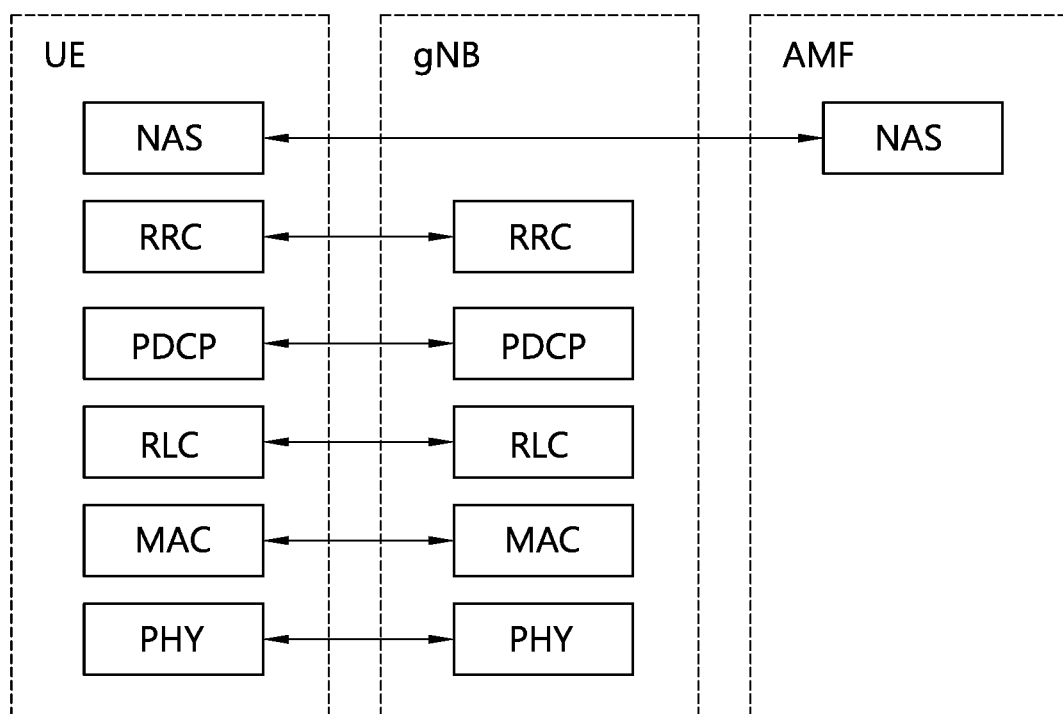
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Reselection priority handling in LTE/LTE-A is described. Section 5.2.4.1 of 3GPP TS 36.304 V14.6.0 (2018-03) may be referred.

Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signaling, the UE shall ignore all the priorities provided in system information. If UE is in camped on any cell state, UE shall only apply the priorities provided by system information from current cell, and the UE preserves priorities provided by dedicated signaling and deprioritisationReq received in RRCConnectionReject unless specified otherwise. When the UE in camped normally state, has only dedicated priorities other than for the current frequency, the UE shall consider the current frequency to be the lowest priority frequency (i.e. lower than any of the network configured values). While the UE is camped on a suitable closed subscriber group (CSG) cell in normal coverage, the UE shall always consider the current frequency to be the highest priority frequency (i.e. higher than any of the network configured values), irrespective of any other priority value allocated to this frequency. If the UE capable of sidelink communication is configured to perform sidelink communication and can only perform the sidelink communication while camping on a frequency, the UE may consider that frequency to be the highest priority. If the UE capable of vehicle-to-everything (V2X) sidelink communication is configured to perform V2X sidelink communication and can only perform the V2X sidelink communication while camping on a frequency, the UE may consider that frequency to be the highest priority. If the UE capable of V2X sidelink communication is configured to perform V2X sidelink communication and can only use pre-configuration while not camping on a frequency, the UE may consider the frequency providing inter-carrier V2X sidelink configuration to be the highest priority. If the UE capable of sidelink discovery is configured to perform Public Safety related sidelink discovery and can only perform the public safety related sidelink discovery while camping on a frequency, the UE may consider that frequency to be the highest priority.

If the UE is capable either of multimedia broadcast multicast services (MBMS) service continuity or of single cell point-to-multipoint (SC-PTM) reception and is receiving or interested to receive an MBMS service and can only receive this MBMS service while camping on a frequency on which it is provided, the UE may consider that frequency to be the highest priority during the MBMS session as long as the two following conditions are fulfilled:

1) Either:
   the UE is capable of MBMS service continuity and the reselected cell is broadcasting SIB13; or
   the UE is capable of SC-PTM reception and the reselected cell is broadcasting SIB20;

2) Either:
   SIB15 of the serving cell indicates for that frequency one or more MBMS service area identifiers (SAIs) included and associated with that frequency in the MBMS user service description (USD) of this service; or
   SIB15 is not broadcast in the serving cell and that frequency is included in the USD of this service.

If the UE is capable either of MBMS service continuity or of SC-PTM reception and is receiving or interested to receive an MBMS service provided on a downlink only MBMS frequency, on a frequency used by dedicated MBMS cells, on a frequency used by further enhanced MBMS (FeMBMS)/unicast-mixed cells, or on a frequency belonging to PLMN different from its registered PLMN, the UE may consider cell reselection candidate frequencies at which it cannot receive the MBMS service to be of the lowest priority during the MBMS session, as long as the above mentioned condition 1) is fulfilled for the cell on the MBMS frequency which the UE monitors or this cell broadcasts SIB1-MBMS and as long as the above mentioned condition 2) is fulfilled for the serving cell.

If the UE is not capable of MBMS service continuity but has knowledge on which frequency an MBMS service of interest is provided, it may consider that frequency to be the highest priority during the MBMS session as long as the reselected cell is broadcasting SIB13.

If the UE is not capable of MBMS service continuity but has knowledge on which downlink only frequency, on which frequency used by dedicated MBMS cells, on which frequency used by FeMBMS/unicast-mixed cells or on which frequency belonging to PLMN different from its registered PLMN an MBMS service of interest is provided, it may consider cell reselection candidate frequencies at which it cannot receive the MBMS service to be of the lowest priority during the MBMS session as long as the cell on the MBMS frequency which the UE monitors is broadcasting SIB13 or SIB1-MBMS.

In case UE receives RRCConnectionReject with deprioritisationReq, UE shall consider current carrier frequency and stored frequencies due to the previously received RRCConnectionReject with deprioritisationReq or all the frequencies of E-UTRA to be the lowest priority frequency (i.e. lower than any of the network configured values) while T325 is running irrespective of camped RAT. The UE shall delete the stored deprioritization request(s) when a PLMN selection is performed on request by NAS.

The UE shall delete priorities provided by dedicated signaling when:
  the UE enters RRC_CONNECTED state; or
  the optional validity time of dedicated priorities (T320) expires; or
  a PLMN selection is performed on request by NAS.

The UE shall only perform cell reselection evaluation for E-UTRAN frequencies and inter-RAT frequencies that are given in system information and for which the UE has a priority provided.

The UE shall not consider any black listed cells as candidate for cell reselection.

The UE shall inherit the priorities provided by dedicated signaling and the remaining validity time (i.e. T320 in E-UTRA, T322 in UTRA and T3230 in GERAN), if configured, at inter-RAT cell (re)selection.

While T360 is running, redistribution target is considered to be the highest priority (i.e. higher than any of the network configured values). UE shall continue to consider the serving frequency as the highest priority until completion of E-UTRAN Inter-frequency redistribution procedure if triggered on T360 expiry/stop.

Measurement rules for cell re-selection in LTE/LTE-A is described. Section 5.2.4.2 of 3GPP TS 36.304 V14.6.0 (2018-03) may be referred.

When evaluating Srxlev and Squal of non-serving cells for reselection purposes, the UE shall use parameters provided by the serving cell.

Following rules are used by the UE to limit needed measurements:

1> If the serving cell fulfils Srxlev>$S_{IntraSearchP}$ and Squal>$S_{IntraSearchQ}$, the UE may choose not to perform intra-frequency measurements.

1> Otherwise, the UE shall perform intra-frequency measurements.

1> The UE shall apply the following rules for E-UTRAN inter-frequencies and inter-RAT frequencies which are indicated in system information and for which the UE has priority provided:

2> For an E-UTRAN inter-frequency or inter-RAT frequency with a reselection priority higher than the reselection priority of the current E-UTRA frequency, the UE shall perform measurements of higher priority E-UTRAN inter-frequency or inter-RAT frequencies.

2> For an E-UTRAN inter-frequency with an equal or lower reselection priority than the reselection priority of the current E-UTRA frequency and for inter-RAT frequency with lower reselection priority than the reselection priority of the current E-UTRAN frequency:

3> If the serving cell fulfils Srxlev>$S_{nonIntraSearchP}$ and Squal>$S_{nonIntraSearchQ}$, the UE may choose not to perform measurements of E-UTRAN inter-frequencies or inter-RAT frequency cells of equal or lower priority unless the UE is triggered to measure an E-UTRAN inter-frequency which is configured with redistributionInterFreqInfo.

3> Otherwise, the UE shall perform measurements of E-UTRAN inter-frequencies or inter-RAT frequency cells of equal or lower priority.

1> If the UE supports relaxed monitoring and s-SearchDeltaP is present in SystemInformationBlockType3, the UE may further limit the needed measurements.

Reselection priorities handling in NR is described. Section 5.2.4.1 of 3GPP TS 38.304 V2.0.0 (2018-06) may be referred.

Absolute priorities of different NR frequencies or inter-RAT frequencies may be provided to the UE in the system information, in the RRCRelease message, or by inheriting from another RAT at inter-RAT cell (re)selection. In the case of system information, a NR frequency or inter-RAT frequency may be listed without providing a priority (i.e. the field cellReselectionPriority is absent for that frequency). If priorities are provided in dedicated signaling, the UE shall ignore all the priorities provided in system information.

The UE shall only perform cell reselection evaluation for NR frequencies and inter-RAT frequencies that are given in system information and for which the UE has a priority provided.

The UE shall delete priorities provided by dedicated signaling when:
  the UE enters a different RRC state; or
  the optional validity time of dedicated priorities (T320) expires; or
  a PLMN selection is performed on request by NAS.

The UE shall only perform cell reselection evaluation for NR frequencies and inter-RAT frequencies that are given in system information and for which the UE has a priority provided.

The UE shall not consider any black listed cells as candidate for cell reselection.

The UE shall inherit the priorities provided by dedicated signaling and the remaining validity time (i.e. T320 in NR and E-UTRA), if configured, at inter-RAT cell (re)selection.

Measurement rules for cell re-selection in NR is described. Section 5.2.4.2 of 3GPP TS 38.304 V2.0.0 (2018-06) may be referred.

When evaluating Srxlev and Squal of non-serving cells for reselection purposes, the UE shall use parameters provided by the serving cell.

Following rules are used by the UE to limit needed measurements:

1> If the serving cell fulfils Srxlev>$S_{IntraSearchP}$ and Squal>$S_{IntraSearchQ}$, the UE may choose not to perform intra-frequency measurements.

1> Otherwise, the UE shall perform intra-frequency measurements.

1> The UE shall apply the following rules for NR inter-frequencies and inter-RAT frequencies which are indicated in system information and for which the UE has priority provided:

2> For a NR inter-frequency or inter-RAT frequency with a reselection priority higher than the reselection priority of the current NR frequency, the UE shall perform measurements of higher priority NR inter-frequency or inter-RAT frequencies.

2> For a NR inter-frequency with an equal or lower reselection priority than the reselection priority of the current NR frequency and for inter-RAT frequency with lower reselection priority than the reselection priority of the current NR frequency:

3> If the serving cell fulfils Srxlev>$S_{nonIntraSearchP}$ and Squal>$S_{nonIntraSearchQ}$, the UE may choose not to perform measurements of NR inter-frequencies or inter-RAT frequency cells of equal or lower priority.

3> Otherwise, the UE shall perform measurements of NR inter-frequencies or inter-RAT frequency cells of equal or lower priority.

As described above, in LTE/LTE-A, at inter-RAT cell (re)selection, the UE inherits the priorities provided by dedicated signaling and the remaining validity time (e.g. T320), and the inherited priorities are deleted/discarded only when 1) the UE enters RRC_CONNECTED state, or 2) the optional validity time of dedicated priorities (T320) expires, or 3) a PLMN selection is performed on request by NAS. In other cases, the inherited priorities are not deleted/discarded. Therefore, for example, if the UE has inherited the dedicated priorities from GERAN or UTRAN, and then the UE moves to an LTE cell, the UE should keep the dedicated priorities inherited from GERAN and/or UTRAN until T320 expires. Even if the UE moves from the LTE cell to an NR cell, before T320 expiry, the UE should keep the dedicated priorities inherited from GERAN or UTRAN even in NR cell.

However, the dedicated priorities inherited from GERAN or UTRAN does not include any priority related to NR frequency because the mobility to NR is not supported while the UE camps on GERAN/UTRAN cell. The UE only performs cell reselection evaluation for frequencies that are given in system information and for which the UE has a priority provided. Furthermore, if priorities are provided in dedicated signaling, the UE ignores all the priorities provided in system information.

In summary, the UE cannot discard/delete the dedicated priorities inherited from GERAN or UTRAN which does not include any priority related to NR frequency before T320 expiry. Even though the broadcast priorities via system information includes priority related to NR frequency, the UE cannot apply the broadcast priorities since the dedicated priorities inherited from GERAN or UTRAN are not yet discard/deleted. This problem should be addressed.

Figure 7:
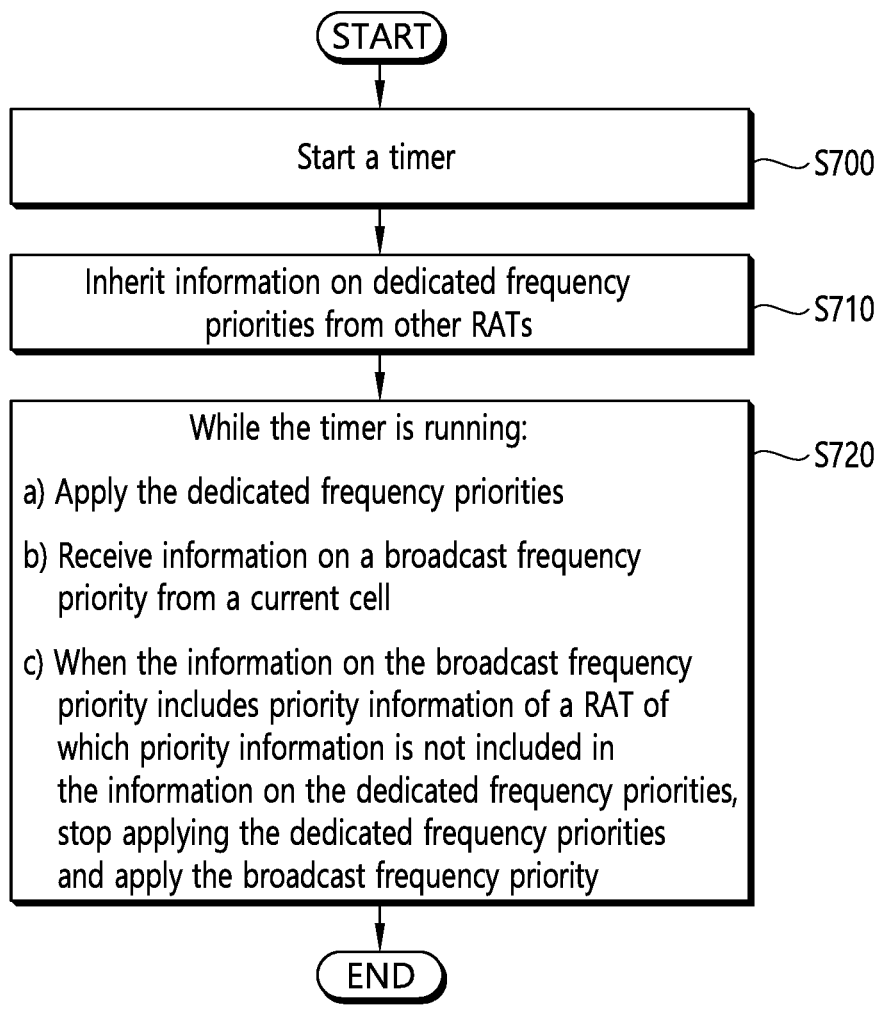
FIG. 7 shows an example of a method for handling frequency priorities inherited from other RATs according to an embodiment of the present invention.

FIG. 7 shows an example of a method for handling frequency priorities inherited from other RATs according to an embodiment of the present invention.

In step S700, the UE starts a timer (e.g. T320). The timer may be stared upon entering RRC_IDLE.

In step S710, the UE inherits information on dedicated frequency priorities from other RATs. The other RATs may include at least one of UTRAN, GERAN and/or NR.

In step S720, while the timer is running, the UE applies the dedicated frequency priorities, and receives information on a broadcast frequency priority from a current cell. When the information on the broadcast frequency priority includes priority information of a RAT of which priority information is not included in the information on the dedicated frequency priorities, the UE stops applying the dedicated frequency priorities and applies the broadcast frequency priority. The UE may delete the dedicated frequency priorities. Or, instead of deleting the dedicated frequency priorities as a whole, the priority information of a RAT of which priority information is not included in the information on the dedicated frequency priorities may be added/updated.

More specifically, the UE may determine whether the information on the broadcast frequency priority includes the priority information of the RAT of which priority information is not included in the information on the dedicated frequency priorities. That is, the UE may decide whether to keep applying/using or stopping applying/deleting the dedicated frequency priorities inherited from other RATs after cell re-selection by comparing RAT(s) included in the broadcast frequency priority information received from the current serving cell and RAT(s) included in the dedicated frequency priorities inherited from other RATs. Details are as follows.

(1) Upon cell re-selection, UE receives the information on broadcast frequency priority via system information, but does not apply the broadcast frequency priority. That is, the UE keeps applying the dedicated frequency priorities inherited from other RATs.

(2) If the information on broadcast frequency priority received the from current serving cell includes a priority for a RAT of which priority is not included in the dedicated frequency priorities inherited from other RATs and the UE supports the corresponding RAT, the UE stops applying the dedicated frequency priorities inherited from other RATs and applies the broadcast frequency priority. Desirably, UE may delete the dedicated frequency priorities inherited from other RATs when stop applying the dedicated frequency priorities inherited from other RATs.

For example, the UE may have inherited the dedicated frequency priorities from UTRAN or GERAN and the dedicated frequency priorities may not include any priority information of NR frequency, because the mobility from UTRAN/GERAN to NR is not supported. An LTE serving cell may broadcast priority information of NR frequencies when there are some NR neighbor cells around the LTE serving cell. In this case, if the UE does not apply the broadcast frequency priorities and keep using the dedicated frequency priorities inherited from UTRAN/GERAN, the UE cannot perform measurements on NR frequencies and cannot reselect NR cell. However, by stopping applying/using, or desirably deleting, the dedicated frequency priorities inherited from UTRAN/GERAN, the UE can apply broadcast frequency priorities, and the UE can find NR neighbor cell and move to the NR neighbor cell.

For another example, the UE may have inherited the dedicated frequency priorities from NR and the dedicated frequency priorities may not include any priority information of UTRAN/GERAN frequency, because the mobility from NR to UTRAN/GERAN is not supported. An LTE serving cell may broadcast priority information of UTRAN/GERAN frequencies when there are some UTRAN/GERAN neighbor cells around the LTE serving cell. In this case, if the UE does not apply the broadcast frequency priorities and keep using the dedicated frequency priorities inherited from NR, the UE cannot perform measurements on UTRAN/GERAN frequencies and cannot reselect UTRAN/GERAN cell. However, by stopping applying/using, or desirably deleting, the dedicated frequency priorities inherited from NR, the UE can apply broadcast frequency priorities, and the UE can find UTRAN/GERAN neighbor cell and move to the UTRAN/GERAN neighbor cell.

Otherwise, the UE keeps applying the dedicated frequency priorities inherited from other RATs even after cell re-selection. That is, when the information on the broadcast frequency priority information does not include the priority information of the RAT of which priority information is not included in the information on the dedicated frequency priorities, the UE may keep applying the dedicated frequency priorities.

Meanwhile, after stopping applying the dedicated frequency priorities inherited from other RATs, the UE may determine whether to resume applying the dedicated frequency priorities. That is, the UE may decide whether to apply again the suspended dedicated frequency priorities after cell re-selection by comparing the broadcast frequency priority information received from the current serving cell and the dedicated frequency priorities inherited from other RAT. It may be determined to resume applying the dedicated frequency priorities when the information on the broadcast frequency priority includes priority information only for a RAT of which priority information is included in the information on the dedicated frequency priorities.

According to the embodiment of the present invention shown in FIG. 7, when the UE moves from GERAN/UTRAN cell to NR cell or vice versa, the UE can decide whether to keep or delete the dedicated frequency priorities inherited from other RATs. By deleting the dedicated frequency priorities inherited from other RATs if necessary, the UE can apply the broadcast frequency priorities, and can perform cell (re)-selection efficiently.

Figure 8:
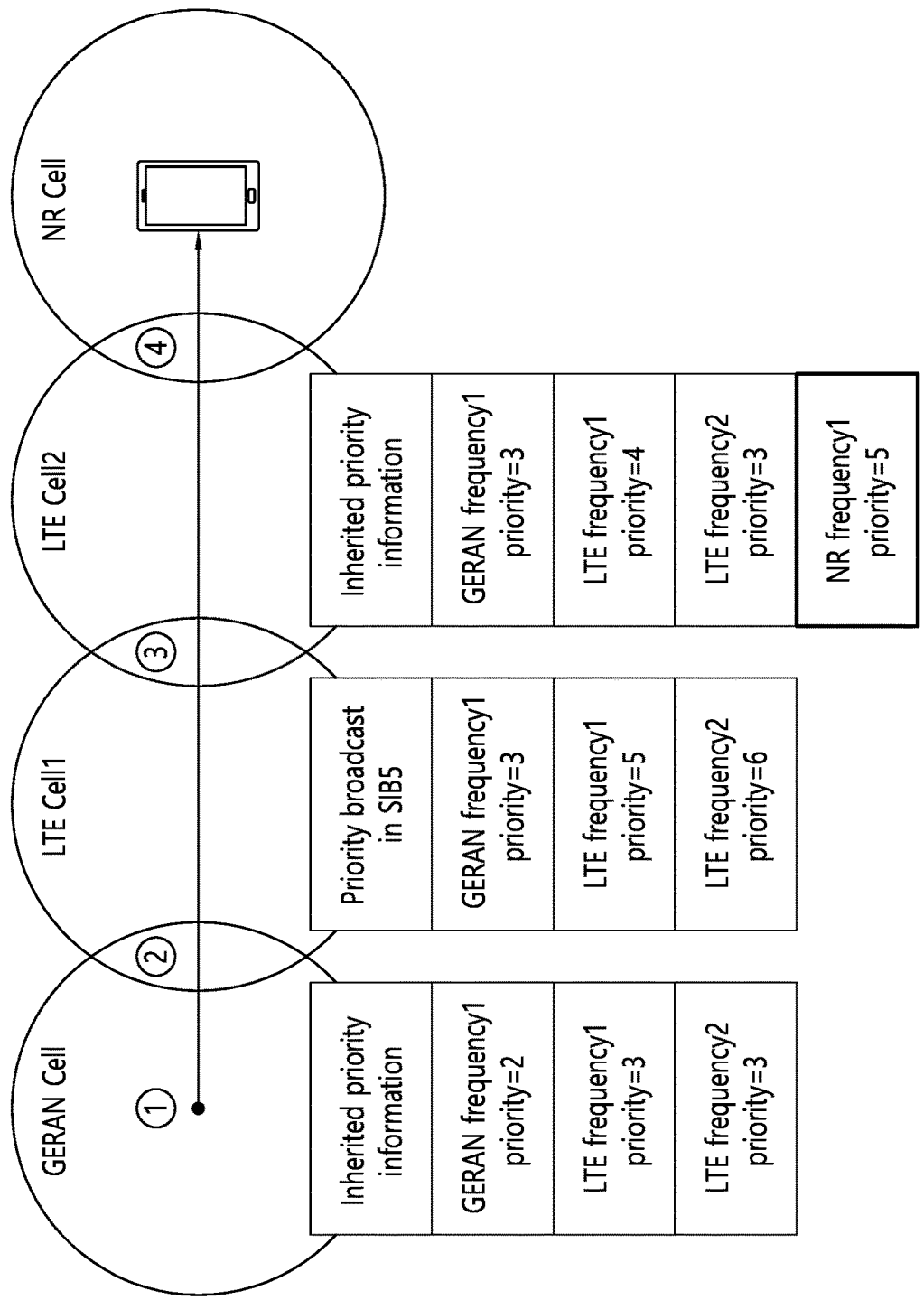
FIG. 8 shows an example of handling dedicated frequency priorities when a UE has inherited the dedicated frequency priorities from GERAN and moves to NR cell according to an embodiment of the present invention.

FIG. 8 shows an example of handling dedicated frequency priorities when a UE has inherited the dedicated frequency priorities from GERAN and moves to NR cell according to an embodiment of the present invention.

(1) The UE receives information on dedicated frequency priorities from serving GERAN cell when the UE enters GSM_IDLE state. The information on dedicated frequency priorities includes the priority information only for GERAN, UTRAN and E-UTRAN frequencies.

(2) The UE performs cell re-selection procedure, and reselects LTE cell 1. Upon reselecting LTE cell 1, the UE receives information on broadcast frequency priorities via SIB5 from LTE cell 1 to decide whether to keep applying/using or stop applying/using (or desirably, deleting) the dedicated frequency priorities inherited from GERAN.

In this case, SIB5 received from LTE cell 1 includes priority information only for GERAN, UTRAN and E-UTRAN frequencies. So, the UE keeps applying/using the dedicated frequency priorities while camping on LTE cell 1.

(3) The UE performs cell re-selection procedure, and reselects LTE cell 1. Upon reselecting LTE cell 2, the UE receives information on broadcast frequency priorities via SIB5 from LTE cell 2 to decide whether to keep applying/using or stop applying/using (or desirably, deleting) the dedicated frequency priorities.

In this case, SIB5 received from LTE cell 2 includes priority information for NR frequencies as well as priority information for GERAN, UTRAN and E-UTRAN frequencies. The dedicated frequency priorities does not include priority information for NR frequencies. The UE also supports NR, so the UE stops applying/using, or desirably deletes, the dedicated frequency priorities inherited from GERAN and applies the broadcast frequency priorities received from LTE cell 2 via SIB5.

After applying the broadcast frequency priorities, the UE starts to measure NR frequencies and can find neighbor NR cells.

(4) The UE reselects NR cell.

Figure 9:
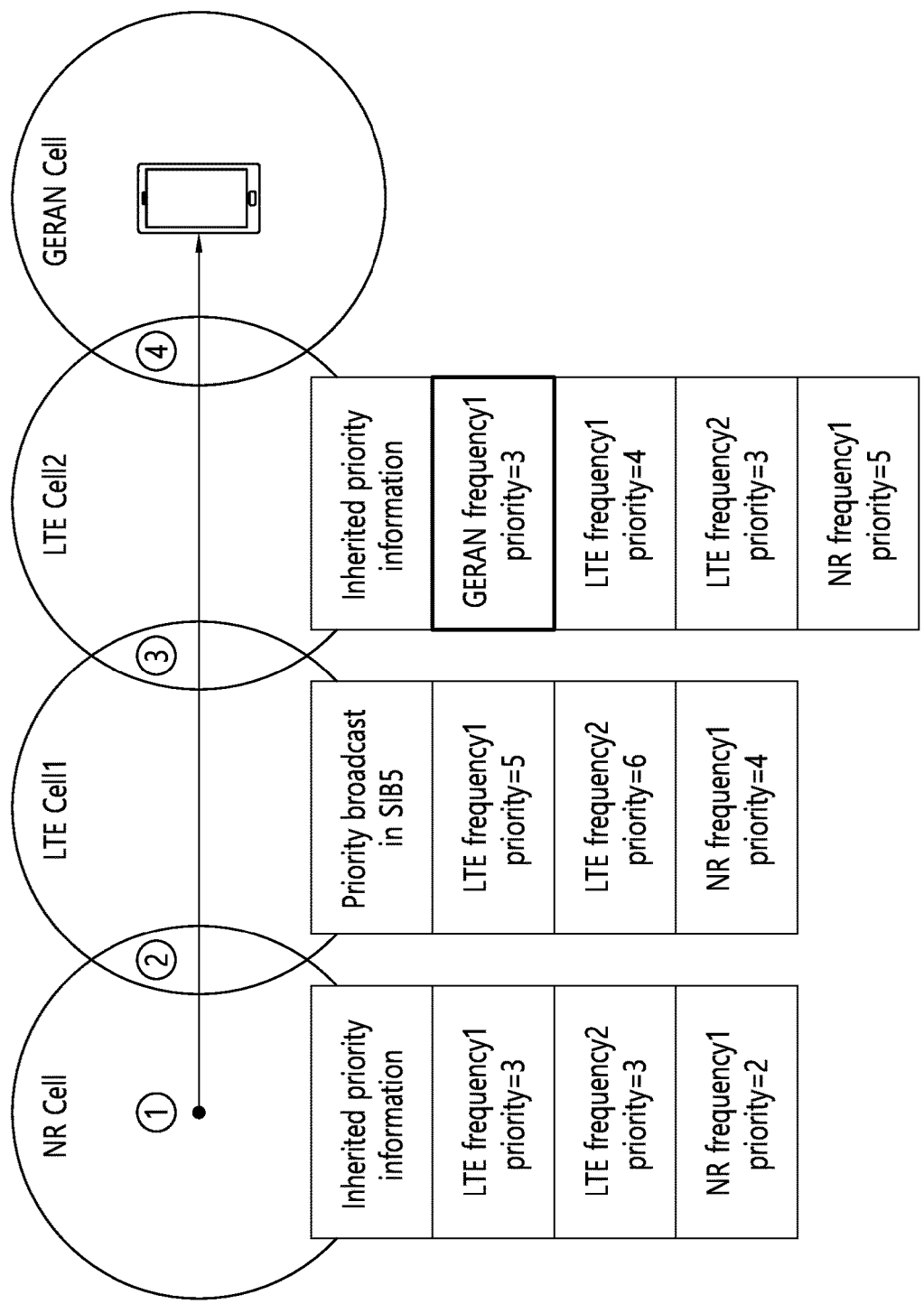
FIG. 9 shows an example of handling dedicated frequency priorities when a UE has inherited the dedicated frequency priorities from NR and moves to GERAN cell according to an embodiment of the present invention.

FIG. 9 shows an example of handling dedicated frequency priorities when a UE has inherited the dedicated frequency priorities from NR and moves to GERAN cell according to an embodiment of the present invention.

(1) The UE receives information on dedicated frequency priorities from serving NR cell when the UE enters RRC_IDLE state. The information on dedicated frequency priorities includes the priority information only for E-UTRAN and NR frequencies.

(2) The UE performs cell re-selection procedure, and reselects LTE cell 1. Upon reselecting LTE cell 1, the UE receives information on broadcast frequency priorities via SIB5 from LTE cell 1 to decide whether to keep applying/using or stop applying/using (or desirably, deleting) the dedicated frequency priorities inherited from NR.

In this case, SIB5 received from LTE cell 1 includes priority information only for E-UTRAN and NR frequencies. So, the UE keeps applying/using the dedicated frequency priorities while camping on LTE cell 1.

(3) The UE performs cell re-selection procedure, and reselects LTE cell 1. Upon reselecting LTE cell 2, the UE receives information on broadcast frequency priorities via SIB5 from LTE cell 2 to decide whether to keep applying/using or stop applying/using (or desirably, deleting) the dedicated frequency priorities.

In this case, SIB5 received from LTE cell 2 includes priority information for GERAN frequencies as well as priority information for E-UTRAN and NR frequencies. The dedicated frequency priorities does not include priority information for GERAN frequencies. The UE also supports GERAN, so the UE stops applying/using, or desirably deletes, the dedicated frequency priorities inherited from NR and applies the broadcast frequency priorities received from LTE cell 2 via SIB5.

After applying the broadcast frequency priorities, the UE starts to measure GERAN frequencies and can find neighbor GERAN cells.

(4) The UE reselects GERAN cell.

Figure 10:
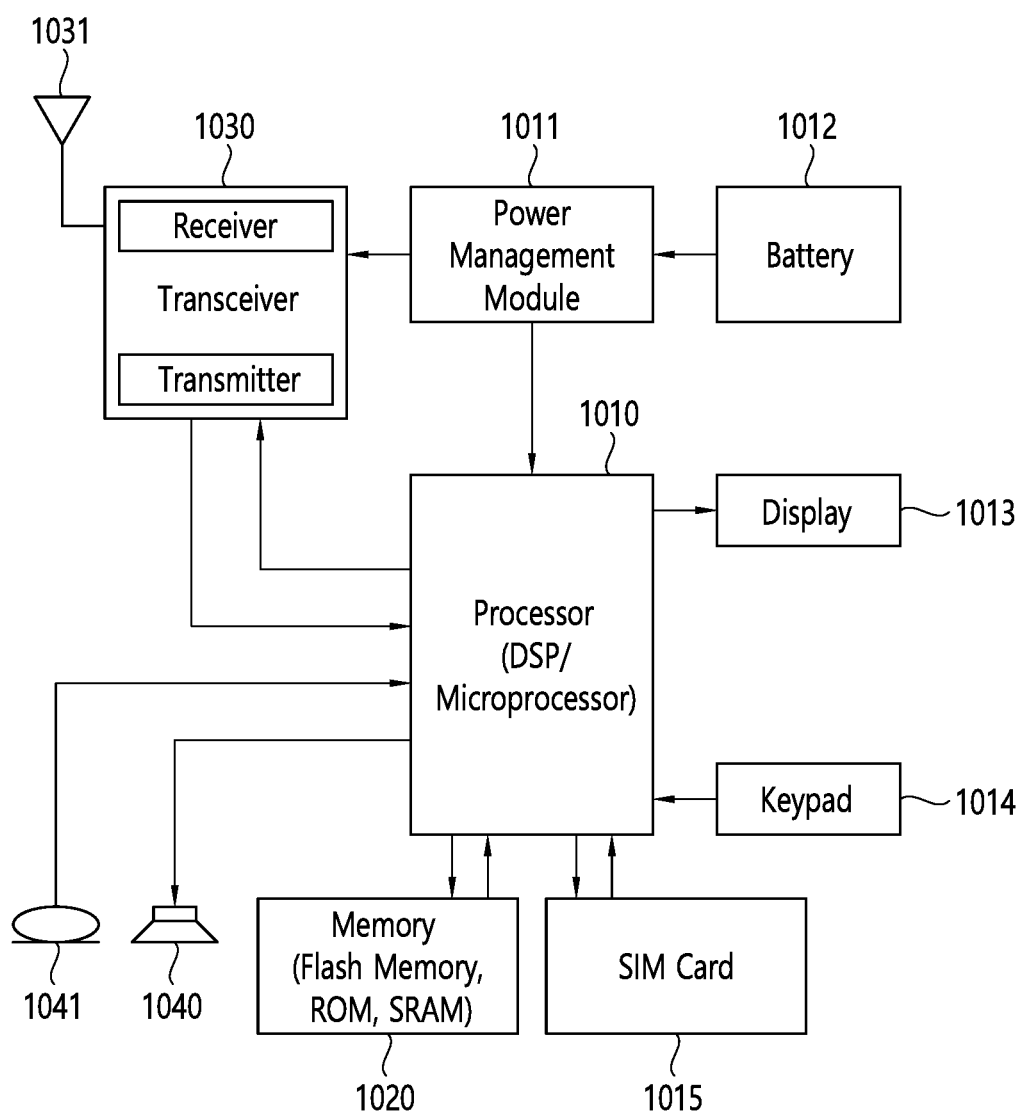
FIG. 10 shows a UE to which the technical features of the present invention can be applied.

FIG. 10 shows a UE to which the technical features of the present invention can be applied.

A UE includes a processor 1010, a power management module 1011, a battery 1012, a display 1013, a keypad 1014, a subscriber identification module (SIM) card 1015, a memory 1020, a transceiver 1030, one or more antennas 1031, a speaker 1040, and a microphone 1041.

The processor 1010 may be configured to implement proposed functions, procedures and/or methods described in this description. Layers of the radio interface protocol may be implemented in the processor 1010. The processor 1010 may include application-specific integrated circuit (ASIC), other chipset, logic circuit and/or data processing device. The processor 1010 may be an application processor (AP). The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1010 is configured to start a timer (e.g. T320). The timer may be started upon entering RRC_IDLE.

The processor 1010 is configured to inherit information on dedicated frequency priorities from other RATs. The other RATs may include at least one of UTRAN, GERAN and/or NR.

While the timer is running, the processor 1010 is configured to apply the dedicated frequency priorities. The processor 1010 is configured to control the transceiver 1030 to receive information on a broadcast frequency priority from a current cell. When the information on the broadcast frequency priority includes priority information of a RAT of which priority information is not included in the information on the dedicated frequency priorities, the processor 1010 is configured to stop applying the dedicated frequency priorities and apply the broadcast frequency priority. The stopping applying the dedicated frequency priorities may comprise deleting the dedicated frequency priorities.

The processor 1010 may be further configured to determine whether the information on the broadcast frequency priority includes the priority information of the RAT of which priority information is not included in the information on the dedicated frequency priorities. The processor 1010 may be further configured to keep applying the dedicated frequency priorities, when the information on the broadcast frequency priority does not include the priority information of the RAT of which priority information is not included in the information on the dedicated frequency priorities.

The processor 1010 may be further configured to determine whether to resume applying the dedicated frequency priorities, after stopping applying the dedicated frequency priorities. It may be determined to resume applying the dedicated frequency priorities when the information on the broadcast frequency priority includes priority information only for a RAT of which priority information is included in the information on the dedicated frequency priorities.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

According to the embodiment of the present invention shown in FIG. 10, when the UE moves from GERAN/UTRAN cell to NR cell or vice versa, the UE can decide whether to keep or delete the dedicated frequency priorities inherited from other RATs. By deleting the dedicated frequency priorities inherited from other RATs if necessary, the UE can apply the broadcast frequency priorities, and can perform cell (re)-selection efficiently.

The present invention may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 11:
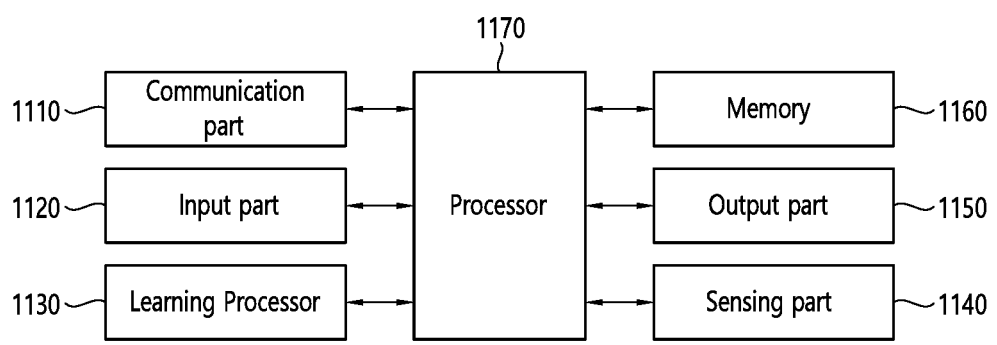
FIG. 11 shows an example of an AI device to which the technical features of the present invention can be applied.

FIG. 11 shows an example of an AI device to which the technical features of the present invention can be applied.

The AI device 1100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 11, the AI device 1100 may include a communication part 1110, an input part 1120, a learning processor 1130, a sensing part 1140, an output part 1150, a memory 1160, and a processor 1170.

The communication part 1110 can transmit and/or receive data to and/or from external devices such as the AI devices and the AI server using wire and/or wireless communication technology. For example, the communication part 1110 can transmit and/or receive sensor information, a user input, a learning model, and a control signal with external devices. The communication technology used by the communication part 1110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1120 can acquire various kinds of data. The input part 1120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1120 can acquire input data to be used when acquiring an output using learning data and a learning model for model learning. The input part 1120 may obtain raw input data, in which case the processor 1170 or the learning processor 1130 may extract input features by preprocessing the input data.

The learning processor 1130 may learn a model composed of an ANN using learning data. The learned ANN can be referred to as a learning model. The learning model can be used to infer result values for new input data rather than learning data, and the inferred values can be used as a basis for determining which actions to perform. The learning processor 1130 may perform AI processing together with the learning processor of the AI server. The learning processor 1130 may include a memory integrated and/or implemented in the AI device 1100. Alternatively, the learning processor 1130 may be implemented using the memory 1160, an external memory directly coupled to the AI device 1100, and/or a memory maintained in an external device.

The sensing part 1140 may acquire at least one of internal information of the AI device 1100, environment information of the AI device 1100, and/or the user information using various sensors. The sensors included in the sensing part 1140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1150 may generate an output related to visual, auditory, tactile, etc.

The output part 1150 may include a display unit for outputting visual information, a speaker for outputting auditory information, and/or a haptic module for outputting tactile information.

The memory 1160 may store data that supports various functions of the AI device 1100. For example, the memory 1160 may store input data acquired by the input part 1120, learning data, a learning model, a learning history, etc.

The processor 1170 may determine at least one executable operation of the AI device 1100 based on information determined and/or generated using a data analysis algorithm and/or a machine learning algorithm. The processor 1170 may then control the components of the AI device 1100 to perform the determined operation. The processor 1170 may request, retrieve, receive, and/or utilize data in the learning processor 1130 and/or the memory 1160, and may control the components of the AI device 1100 to execute the predicted operation and/or the operation determined to be desirable among the at least one executable operation. The processor 1170 may generate a control signal for controlling the external device, and may transmit the generated control signal to the external device, when the external device needs to be linked to perform the determined operation. The processor 1170 may obtain the intention information for the user input and determine the user's requirements based on the obtained intention information. The processor 1170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1130 and/or learned by the learning processor of the AI server, and/or learned by their distributed processing. The processor 1170 may collect history information including the operation contents of the AI device 1100 and/or the user's feedback on the operation, etc. The processor 1170 may store the collected history information in the memory 1160 and/or the learning processor 1130, and/or transmit to an external device such as the AI server. The collected history information can be used to update the learning model. The processor 1170 may control at least some of the components of AI device 1100 to drive an application program stored in memory 1260. Furthermore, the processor 1170 may operate two or more of the components included in the AI device 1100 in combination with each other for driving the application program.

Figure 12:
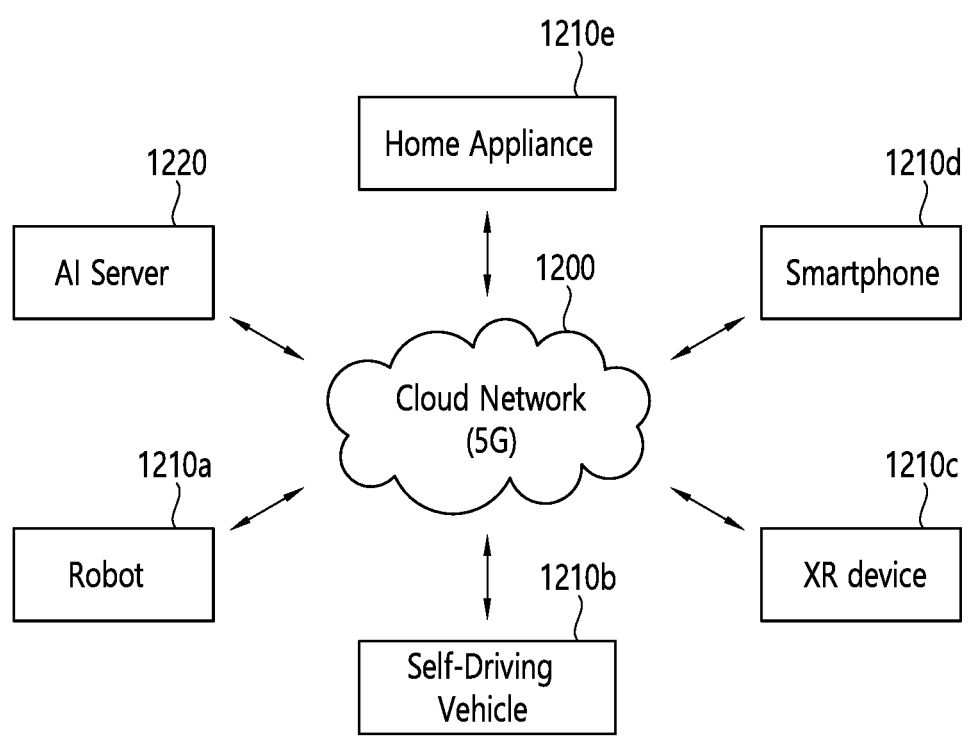
FIG. 12 shows an example of an AI system to which the technical features of the present invention can be applied.

FIG. 12 shows an example of an AI system to which the technical features of the present invention can be applied.

Referring to FIG. 12, in the AI system, at least one of an AI server 1220, a robot 1210a, an autonomous vehicle 1210b, an XR device 1210c, a smartphone 1210d and/or a home appliance 1210e is connected to a cloud network 1200. The robot 1210a, the autonomous vehicle 1210b, the XR device 1210c, the smartphone 1210d, and/or the home appliance 1210e to which the AI technology is applied may be referred to as AI devices 1210a to 1210e.

The cloud network 1200 may refer to a network that forms part of a cloud computing infrastructure and/or resides in a cloud computing infrastructure. The cloud network 1200 may be configured using a 3G network, a 4G or LTE network, and/or a 5G network. That is, each of the devices 1210a to 1210e and 1220 consisting the AI system may be connected to each other through the cloud network 1200. In particular, each of the devices 1210a to 1210e and 1220 may communicate with each other through a base station, but may directly communicate with each other without using a base station.

The AI server 1200 may include a server for performing AI processing and a server for performing operations on big data. The AI server 1200 is connected to at least one or more of AI devices constituting the AI system, i.e. the robot 1210a, the autonomous vehicle 1210b, the XR device 1210c, the smartphone 1210d and/or the home appliance 1210e through the cloud network 1200, and may assist at least some AI processing of the connected AI devices 1210a to 1210e. The AI server 1200 can learn the ANN according to the machine learning algorithm on behalf of the AI devices 1210a to 1210e, and can directly store the learning models and/or transmit them to the AI devices 1210a to 1210e. The AI server 1200 may receive the input data from the AI devices 1210a to 1210e, infer the result value with respect to the received input data using the learning model, generate a response and/or a control command based on the inferred result value, and transmit the generated data to the AI devices 1210a to 1210e. Alternatively, the AI devices 1210a to 1210e may directly infer a result value for the input data using a learning model, and generate a response and/or a control command based on the inferred result value.

Various embodiments of the AI devices 1210a to 1210e to which the technical features of the present invention can be applied will be described. The AI devices 1210a to 1210e shown in FIG. 12 can be seen as specific embodiments of the AI device 1100 shown in FIG. 11.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a wireless device in a wireless communication system, the method comprising:
starting a timer;
inheriting information on dedicated frequency priorities from other radio access technologies (RATs);
while the timer is running:
applying the dedicated frequency priorities;
receiving information on a broadcast frequency priority from a current cell; and
when the information on the broadcast frequency priority includes priority information of a RAT of which priority information is not included in the information on the dedicated frequency priorities, stopping applying the dedicated frequency priorities and applying the broadcast frequency priority.

2. The method of claim 1, wherein the stopping applying the dedicated frequency priorities comprises deleting the dedicated frequency priorities.

3. The method of claim 1, wherein the other RATs includes at least one of a UMTS terrestrial radio access network (UTRAN), a GSM EDGE radio access network (GERAN) and/or a new radio access technology (NR).

4. The method of claim 1, further comprising determining whether the information on the broadcast frequency priority includes the priority information of the RAT of which priority information is not included in the information on the dedicated frequency priorities.

5. The method of claim 1, further comprising keeping applying the dedicated frequency priorities, when the information on the broadcast frequency priority does not include the priority information of the RAT of which priority information is not included in the information on the dedicated frequency priorities.

6. The method of claim 1, further comprising determining whether to resume applying the dedicated frequency priorities, after stopping applying the dedicated frequency priorities.

7. The method of claim 6, wherein it is determined to resume applying the dedicated frequency priorities when the information on the broadcast frequency priority includes priority information only for a RAT of which priority information is included in the information on the dedicated frequency priorities.

8. The method of claim 1, wherein the timer is started upon entering a radio resource control (RRC) idle state.

9. The method of claim 1, wherein the wireless device is in communication with at least one of a user equipment, a network, and/or autonomous vehicles other than the wireless device.

10. A wireless device in a wireless communication system, the wireless device comprising:
a memory;
a transceiver; and
a processor, operably coupled to the memory and the transceiver,
wherein the processor is configured to start a timer;
wherein the processor is configured to inherit information on dedicated frequency priorities from other radio access technologies (RATs);
while the timer is running:
wherein the processor is configured to apply the dedicated frequency priorities;

wherein the transceiver is configured to receive information on a broadcast frequency priority from a current cell; and when the information on the broadcast frequency priority includes priority information of a RAT of which priority information is not included in the information on the dedicated frequency priorities, wherein the processor is configured to stop applying the dedicated frequency priorities and apply the broadcast frequency priority.

11. The wireless device of claim 10, wherein the stopping applying the dedicated frequency priorities comprises deleting the dedicated frequency priorities.

12. The wireless device of claim 10, wherein the other RATs includes at least one of a UMTS terrestrial radio access network (UTRAN), a GSM EDGE radio access network (GERAN) and/or a new radio access technology (NR).

13. The wireless device of claim 10, wherein the processor is further configured to determine whether the information on the broadcast frequency priority includes the priority information of the RAT of which priority information is not included in the information on the dedicated frequency priorities.

14. The wireless device of claim 10, wherein the processor is further configured to determine whether to resume applying the dedicated frequency priorities, after stopping applying the dedicated frequency priorities.

15. The wireless device of claim 14, wherein it is determined to resume applying the dedicated frequency priorities when the information on the broadcast frequency priority includes priority information only for a RAT of which priority information is included in the information on the dedicated frequency priorities.

* * * * *